United States Patent
Si et al.

(10) Patent No.: US 12,147,391 B2
(45) Date of Patent: Nov. 19, 2024

(54) METHOD FOR SERVICE PROCESSING AND SYSTEM, DEVICE, AND MEDIUM

(71) Applicant: INSPUR SUZHOU INTELLIGENT TECHNOLOGY CO., LTD., Jiangsu (CN)

(72) Inventors: Longhu Si, Jiangsu (CN); Yonggang Hu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,509

(22) PCT Filed: Feb. 26, 2021

(86) PCT No.: PCT/CN2021/077998
§ 371 (c)(1),
(2) Date: Jul. 6, 2023

(87) PCT Pub. No.: WO2022/016865
PCT Pub. Date: Jan. 27, 2022

(65) Prior Publication Data
US 2024/0104059 A1    Mar. 28, 2024

(30) Foreign Application Priority Data
Jul. 24, 2020 (CN) .......................... 202010724257.7

(51) Int. Cl.
*G06F 16/10* (2019.01)
*G06F 16/11* (2019.01)
(Continued)

(52) U.S. Cl.
CPC ........ *G06F 16/1767* (2019.01); *G06F 16/122* (2019.01); *G06F 16/162* (2019.01)

(58) Field of Classification Search
None
See application file for complete search history.

(56) References Cited

U.S. PATENT DOCUMENTS 9,898,474 B1    2/2018  Sorenson, III
2004/0015481 A1 *  1/2004  Zinda .................... G06F 16/30
(Continued)

FOREIGN PATENT DOCUMENTS

CN    102024017 A    4/2011
CN    103473260 A    12/2013
(Continued)

OTHER PUBLICATIONS

International search report for PCT/CN2021/077998 mailed on Jun. 1, 2021.

*Primary Examiner* — Jau Shya Meng
(74) *Attorney, Agent, or Firm* — Dennemeyer & Associates LLC; Victoria Friedman (57) ABSTRACT

The disclosure discloses a method for service processing and system, including: determining a first quantity parameter for acquiring index shards each time and a second quantity parameter of objects acquired by each of the index shards each time; assigning first weight to the first quantity parameter to obtain third quantity parameter for acquiring the index shards; listing, from a plurality of index shards at a bucket, index shards corresponding to the third quantity parameter, and listing, from each of the index shards which is listed, the objects corresponding to the second quantity parameter, so as to obtain a matrix which takes each index shard as a column and a plurality of objects corresponding to each shard as rows; successively extracting the plurality of the objects corresponding to each row of the matrix; and according to preset number of concurrent processing, processing the plurality of the objects extracted each time.

18 Claims, 3 Drawing Sheets

(51) Int. Cl.
  *G06F 16/16*   (2019.01)
  *G06F 16/176*  (2019.01)

(56) References Cited

U.S. PATENT DOCUMENTS

| | | | |
|---|---|---|---|
| 2014/0214799 A1* | 7/2014 | Li | G06F 16/24532 |
| | | | 707/718 |
| 2015/0261858 A1* | 9/2015 | Tang | G06F 16/951 |
| | | | 705/14.42 |
| 2016/0057507 A1* | 2/2016 | McKenna | H04N 21/435 |
| | | | 725/28 |
| 2018/0121239 A1 | 5/2018 | Sawhney et al. | |

FOREIGN PATENT DOCUMENTS

| CN | 104123359 A | 10/2014 |
|---|---|---|
| CN | 106250409 A | 12/2016 |
| CN | 109614372 A | 4/2019 |
| CN | 110175175 A | 8/2019 |
| CN | 111291023 A | 6/2020 |
| CN | 111857890 A | 10/2020 |

\* cited by examiner

METHOD FOR SERVICE PROCESSING AND SYSTEM, DEVICE, AND MEDIUM

CROSS-REFERENCE TO RELATED APPLICATION

This application is based upon and claims priority to Chinese Patent Application No. 202010724257.7, filed to the China National Intellectual Property Administration on Jul. 24, 2020 and entitled "Method for Service Processing and System, Device, and Medium", the disclosure of which is hereby incorporated by reference in its entirety.

TECHNICAL FIELD

The present disclosure relates to the field of service processing, and specifically, to a method for service processing and system, a device, and a storage medium.

BACKGROUND

A distributed object storage system is a specific implementation of software-defined storage, and a new form of network storage. Based on data access characteristics using Key-Value, the system usually can store ultra-large-scale unstructured data (a data size stored by a bucket can even reach the level of hundreds of billions). For large-scale data, there is a need for a means to automatically manage the data, and generally, this automated management service is called Lifecycle (LC, lifecycle management).

Key-Value data access ensures that the carrying of any Key to access the Value does not introduce additional index overhead due to the expansion of the data size. This is because, for the accessing of the data, a Hash method is used for location instead of locating a specific position of the data corresponding to the Key by means of listing. However, this does not mean that indexes are not required to be recorded, because there is a part of the service scenario is required to be performed by means of traversing, during traversing, a specific Key value is not carried, the purpose is to obtain a series of Key values, and LC is such a service.

Currently, objects under a bucket (which may also be called a Container, object storage provides a bucket and object-based flat storage mode, all objects in the bucket are at the same logical level, and a multi-level tree directory tree structure in a file system is eliminated) record indexes by means of rados objects. If only one rados object is used to record the indexes, a write operation needs to access the rados object, which may cause performance bottlenecks due to locking. In order to improve concurrent capacities, the indexes are generally divided into shards, and the number of shards is recorded as number of shards. If there are enough objects under the bucket and there are enough shards, the objects are uniformly distributed on each shard. In this case, listing is a very problematic issue. Current listing uses a manner of sort listing. If 1000 objects after a certain object are required to be acquired, the first 1000 objects from the object are taken from each shard, then sorting is performed, and the first sorted 1000 objects are taken to return. In this way, there will be (the number of objects*number of shards)/1000 IOs generated, the normal number of IOs should be (the number of objects/1000), the number of IOs is several times of the normal shards. In this way, the data size acquired is 1000*number of shards*data size to be acquired by a single object. If there are excessive number of shards, it not only increases the IO, but also improves memory use. The LC currently uses such a sort listing mode. In addition to the above problems, there is also a problem that the 1000 objects listed under a multi-version scenario by means of the listing mode may be concentrated on one shard. In this case, if the processing mode of the LC after traversing the objects is concurrent, the concurrent operations of the LC are concentrated on one shard, which is completely inefficient, and this is the reason of not using the manner of first listing one shard and then listing the next.

SUMMARY

An embodiment of the present disclosure provide a method for service processing, the method includes:
  a first quantity parameter for acquiring index shards each time and a second quantity parameter of objects acquired by each of the index shards each time are determined;
  a first weight is assigned to the first quantity parameter to obtain a third quantity parameter for acquiring the index shards;
  index shards corresponding to the third quantity parameter are listed from a plurality of index shards at a bucket, and the objects corresponding to the second quantity parameter are listed from each of the index shards is listed, so as to obtain a matrix, wherein the matrix takes each of the index shards which is listed as a column and a plurality of objects corresponding to each of the index shards which is listed as rows;
  the plurality of the objects corresponding to each of the rows of the matrix are successively extracted;
  according to preset number of concurrent processing, the plurality of the objects extracted each time are processed.

In some embodiments, the step of successively extracting the plurality of the objects corresponding to each row of the matrix further includes:
  after the plurality of the objects is extracted each time, extracted objects are deleted from the matrix.

In some embodiments, the method further includes the following operations:
  a second weight is assigned to the first quantity parameter, so as to obtain a threshold;
  before the plurality of the objects is extracted each time, whether the number of the index shards still having the objects is greater than 0 and less than the threshold is determined;
  in response to the number of the index shards still having the objects being greater than 0 and less than the threshold, the index shards corresponding to the first quantity parameter are listed from several index shards in the bucket that are not listed, and objects corresponding to the second quantity parameter are listed from each of the index shards which is listed, and newly listed index shards and corresponding objects are added to the matrix.

In some embodiments, the method further includes:
  in response to the number of the index shards still having the objects equaling 0, continuing to list objects corresponding to the second quantity parameter on each index shard in the bucket and corresponding to the matrix, and adding the objects to the matrix.

In some embodiments, the step of according to the preset number of concurrent processing, processing the plurality of the objects extracted each time further includes:
  objects corresponding to the number of concurrent processing are selected from the plurality of the objects extracted each time;

whether the objects which are selected corresponding to the number of concurrent processing are required to be processed is determined;

In response to the objects corresponding to the number of concurrent processing being required to be processed, the objects corresponding to the number of concurrent processing are processed.

In some embodiments, the method further includes:

in response to several of the objects corresponding to the number of concurrent processing being not required to be processed, abandoning the several of the objects that are not required to be processed, and continuing to perform selection from the plurality of the objects extracted, until number of objects required to be processed equals the number of concurrent processing.

In some embodiments, the second weight is less than the first weight.

Based on the same inventive concept, according to another aspect of the present disclosure, an embodiment of the present disclosure further provides a service processing system, the system includes:

a determination component, the determination component is configured to determine a first quantity parameter for acquiring index shards each time and a second quantity parameter of objects acquired by each of the index shards each time.

a weight component, the weight component is configured to assign a first weight to the first quantity parameter to obtain a third quantity parameter for acquiring the index shards.

a listing component, the listing component is configured to list, from a plurality of index shards at a bucket, index shards corresponding to the third quantity parameter, and list, from each of the index shards which is listed, the objects corresponding to the second quantity parameter, so as to obtain a matrix, wherein the matrix takes each of the index shards which is listed as a column and a plurality of objects corresponding to each of the index shards which is listed as rows.

a extraction component, the extraction component is configured to successively extract the plurality of the objects corresponding to each of the rows of the matrix.

a processing component, the processing component is configured to, according to preset number of concurrent processing, process the plurality of the objects extracted each time.

Based on the same inventive concept, according to another aspect of the present disclosure, an embodiment of the present disclosure further provides a computer device, the computer device includes:

at least one processor; and a memory;

the memory is configured to store a computer program executable on the processor. The processor, when executing the program, implements operations of any of the methods for service processing as described above.

Based on the same inventive concept, according to another aspect of the present disclosure, an embodiment of the present disclosure further provides a computer-readable storage medium, the computer-readable storage medium stores a computer program. When the computer program is executed, operations of any of the methods for service processing as described above are executed.

BRIEF DESCRIPTION OF THE DRAWINGS

In order to illustrate the technical solutions in the embodiments of the present disclosure or technical solutions in the prior art more clearly, the drawings used in the technical description of the embodiments will be briefly described below. It is apparent that the drawings in the following descriptions are merely some embodiments of the present disclosure. Other embodiments can be obtained from those skilled in the art according to these drawings without any creative work.

DETAILED DESCRIPTION OF THE EMBODIMENTS

To make the objectives, technical solutions and advantages of the present disclosure clearer, the present disclosure is further described in detail with reference to specific embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Figure 1:
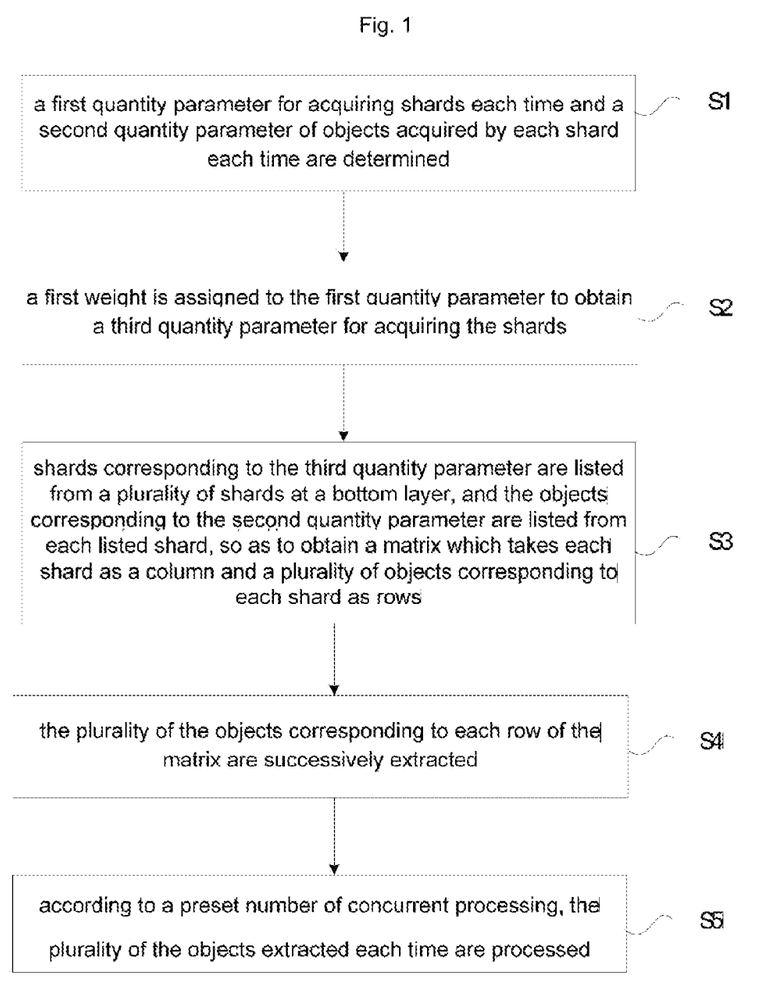
FIG. 1 is a schematic flowchart of a method for service processing according to an embodiment of the present disclosure.

According to an aspect of the present disclosure, an embodiment of the present disclosure provides a method for service processing. As shown in FIG. 1, the method may include the following steps.

At S1, a first quantity parameter for acquiring index shards each time and a second quantity parameter of objects acquired by each of the index shards each time.

At S2, a first weight is assigned to the first quantity parameter to obtain a third quantity parameter for acquiring the index shards.

At S3, index shards corresponding to the third quantity parameter are listed from a plurality of index shards at a bucket, and the objects corresponding to the second quantity parameter are listed from each of the index shards which is listed, so as to obtain a matrix, wherein the matrix takes each of the index shards which is listed as a column and a plurality of objects corresponding to each of the index shards which is listed as rows.

At S4, the plurality of the objects corresponding to each row of the matrix are successively extracted.

At S5, according to a preset number of concurrent processing, the plurality of the objects extracted each time are processed.

By means of the solution provided in the present disclosure, according to the idea of listing some of the objects of some of the index shards in one step and then successively listing the remaining objects, unnecessary IO operations are reduced, thereby reducing the impact of enumeration on properties. During memory use, linear growth of the memory with the increasing of the number of shards cannot be caused, such that a controllable effect can be achieved.

During listing, a continuous segment of objects is distributed over different index shards, thereby improving the performance of subsequent concurrent tasks.

In some embodiments, in S1 of determining the list_max_aio for acquiring the index shards each time and the list_num of objects acquired by each index shard each time, specifically, the first quantity parameter (list_max_aio) for acquiring the index shards each time is the listed concurrence number, that is, how many index shards can be simultaneously listed at one time. The second quantity parameter (list_num) of objects acquired by each index shard each time is the number of objects listed by each index shard each time.

In some embodiments, in S2 of assigning the first weight (init_factor) to the first quantity parameter (list_max_aio) to obtain the third quantity parameter (init_num) for acquiring the index shards, specifically, the number of index shards required to be initially listed is shards_num=(init_factor*list_max_aio, that is, taking an integer multiple of the list_max_aio upwards). It is to be noted that, the number of index shards shards_num to be initially listed is more than the preset number of concurrent processing process_max_aio in S5. The reason is that not every listed object is processed by subsequent concurrent services, and if the initially-listed number of index shards is too small, it is likely that the objects processed by concurrent services fall on the same index shard. Definitely, the number of index shards cannot be too large, according to the above, excessive the number of index shards shards_num may occupy too much memory, such that a reasonable first weight init_factor is required to be selected to ensure that the number of index shards shards_num required to be initially listed is an appropriate value. In addition, if the number of listed index shards is the integer multiple of the listed concurrence number, optimal performance can be achieved. In some embodiments, the number of index shards shards_num required to be initially listed may further be an integer multiple of the list_max_aio taken from init_factor*process_max_aio upwards. That is to say, the first weight init_factor is first assigned to the number of concurrent processing process_max_aio, and then the integer multiple of the list_max_aio is taken upwards, so as to ensure that the number of index shards shards_num required to be initially listed is more than the preset number of concurrent processing process_max_aio in S5.

In some embodiments, in S3 of listing, from the plurality of index shards in the bucket, the index shards corresponding to the third quantity parameter, and listing, from each listed index shard, the objects corresponding to the second quantity parameter, so as to obtain the matrix which takes each index shard as the column and the plurality of the objects corresponding to each index shard as the rows, specifically, after object listing is performed according to set parameters, an object matrix of which row is the init_num and column is the number of shards shards_num required to be initially listed is obtained. The matrix belongs to a part of an object matrix under a bucket (the number of objects under the bucket*the total number of index shards under the bucket).

It is to be noted that, since the number of objects on the index shards is different, when the objects corresponding to the second quantity parameter are listed from each listed index shard, the number of obtained actual objects is less than the second quantity parameter. That is to say, the list_num of the row is based on the objects which are actually listed the most.

In some embodiments, S4 of successively extracting the plurality of the objects corresponding to each row of the matrix further includes the following operation.

After object extraction is performed each time, the extracted objects are deleted from the matrix.

Specifically, data in a current memory is a matrix of list_num*init_num. Then list_num objects are first acquired. The objects are first acquired from the first row of the matrix, and then successively acquired according to the rows, until list_num 1*init_num matrixes are obtained. After object extraction is performed each time, the corresponding objects in the matrix (list_num*init_num) are deleted.

In some embodiments, the method further includes the following operations.

A second weight is assigned to the list_max_aio, so as to obtain a threshold.

Before object extraction is performed each time, whether the number of the index shards still having the objects is greater than 0 and less than the threshold is determined.

In response to the number of the index shards still having the objects being greater than 0 and less than the threshold, the index shards corresponding to the first quantity parameter are listed from several index shards in the bucket that are not listed, the objects corresponding to the second quantity parameter are listed from each listed index shard, and the newly listed index shards and the corresponding objects are added to the matrix.

Specifically, since the objects are randomly assigned, the number of the objects on each index shard is different. Therefore, if the index shards_num with data remaining is less than the threshold (min_num)=the second weight (min_threshold_factor)*the first quantity parameter (list_max_aio), and in order to ensure that the objects processed by concurrent services fall on the same index shard as much as possible, the min_threshold_factor used needs to be an appropriate value, such that index shards and corresponding objects need to be acquired from the bucket again. That is to say, the index shards corresponding to the first quantity parameter are listed from several index shards in the bucket that are listed, the objects corresponding to the second quantity parameter are listed from each listed index shard, and the newly listed index shards and the corresponding objects are added to the matrix. In some embodiments, the threshold (min_num) may further be min_threshold_factor*process_max_aio, so as to ensure that the objects processed by the concurrent services fall on the same index shard as much as possible.

It is to be noted that, if several index shards in the matrix does not have objects during object extraction, and the number of index shards with objects remaining is greater than the threshold, the index shards and the corresponding objects are not acquired from the bucket. That is to say, only when the number of the index shards with objects remaining in the matrix is less than the threshold, other index shards and objects can be acquired from the bucket.

In some embodiments, the method further includes the following operation.

In response to the number of the index shards still having the objects equaling 0, the objects corresponding to the second quantity parameter are continued to list on each index shard in the bucket and corresponding to the matrix, and the objects are added to the matrix.

Specifically, since the number of objects on the index shards is different, each of the index shards initially listed may have the objects corresponding to the second quantity parameter list_num. Therefore, when object extraction is performed for a plurality of times, the number of the index shards still having the objects equals 0, then the objects corresponding to the second quantity parameter are continued to list on each index shard in the bucket and corresponding to the matrix, and the objects are added to the matrix. That is to say, the objects are continued to list on the index shards which have been listed. That is to say, following two directions of successively listing the objects after the same index shard (from top to bottom) and listing the remaining index shards under the bucket (from left to right), enough listed concurrence number is required, so as to adapt a listing mode in the bucket.

It is to be noted that, when the index shards and the objects are listed in the bucket, the objects are preferably listed on the index shards which have been listed. For example, if the index shard, in the matrix, which has no objects has the objects in the bucket, the objects are continued to list on the index shard. If the index shard has no objects, the next index shard is taken for listing. In addition, when the number of the index shards, in the matrix, still having the objects remaining is less than the threshold, list_max_aio index shards required to be listed are further required. In this case, data in a memory is generally a matrix of list_num*(min_num+list_max_aio).

In some embodiments, the step of according to the preset number of concurrent processing, processing the plurality of the objects extracted each time further includes the following operations.

Objects corresponding to the number of concurrent processing are selected from a plurality of extracted objects each time.

Whether the selected objects corresponding to the number of concurrent processing is required to be processed is determined.

In response to the objects corresponding to the number of concurrent processing being required to be processed, the objects corresponding to the number of concurrent processing are processed.

In some embodiments, the method further includes the following operation.

In response to several of the objects corresponding to the number of concurrent processing being not required to be processed, the several objects that are not required to be processed are abandoned, and selection is continuously performed from the plurality of extracted objects, until the number of the objects required to be processed equals the number of concurrent processing.

Specifically, a service after listing is the concurrency of [an administrative operation], which generally has a deletion operation and an archiving operation). Therefore, when the service is processed, the plurality of the objects are first extracted from the matrix, that is, extraction is performed according to the rows. Then the objects corresponding to the number of concurrent processing (process_max_aio) are selected from the plurality of the objects. If the selected objects corresponding to the number of concurrent processing are all required to be processed, the objects corresponding to the number of concurrent processing are processed. If the objects are not required to be processed, the several objects not required to be processed are abandoned, and selection is continuously performed from the plurality of extracted objects, until the number of the objects required to be processed equals the number of concurrent processing.

It is to be noted that, in the embodiments of the present disclosure, it is mainly focused on subsequent services (using LC as an example, the LC indicates that what kind of [administrative operations] should be performed on [matching objects] under the bucket throughout the whole life (from creation to end) under [what circumstances]) after an IO operation, memory use and listing, such that whether the selected objects corresponding to the number of concurrent processing are required to be processed may be determined according to attributes corresponding to the LC of the objects.

In some embodiments, the second weight is less than the first weight. Specifically, the setting of large first weight is intended to, after initial listing, not cause the objects processed by the concurrent services to fall on the same index shard. The setting of small first weight is intended to cause the objects processed by the concurrent services to fall on the same index shard when the objects are extracted from the number of index shards with data remaining for processing.

By means of the solution provided in the present disclosure, index shards of the bucket and the objects under the index shards are used as a storage table, then each index shard is equivalent to a column, and the objects under the index shards are distributed on the rows sorted in order. In the embodiments of the present disclosure, it is equivalent to first acquire some of the objects of some of the index shards to put into the memory, and the objects are taken according to the rows during listing. If a certain index shard is taken out, the subsequent objects of the index shard are continued to acquire. If there are no subsequent objects in the index shard, the next index shard is taken, so as to complete traversing successively, until there are no objects to be traversed under the entire bucket.

It can be learned, from the above traversing process, that each object is traversed once, and each index shard acquires list_num objects each time, such that the number of IOs required for traversing is the total number of objects under the bucket/list_num. Taking the concurrency of the listing into consideration, the time consumed is (the total number of objects under the bucket/list_num/list_max_aio)*single IO time. Compared with sort listing, the number of IOs and the time consumed for listing are greatly reduced. Compared to the successive traversing and listing of the index shards, the number of IOs does not increase, and the time consumed does not increase as wall and even decreases due to the concurrency of the listing. The maximum memory consumed is max[list_num*(min_num+list_max_aio), list_num*init_num]*memory of single object information. Compared with sort listing, the memory is greatly reduced; and compared to the successive traversing and listing of the index shards, the memory is increased but is controllable. The minimum number of index shards in the memory each time is min(min_num+list_max_aio, init_num), such that it ensures that, in a listed object list, a continuous segment of objects is distributed over different index shards, thereby improving the concurrent performance of the concurrent services. Compared with sort listing, in a non-matching version case of the sort listing, the distribution over different index shards is completely random, and in a multi-version case, the objects are completely distributed over a single index shard. Compared to the successive traversing and listing of the index shards, the successive traversing and listing of the index shards are completely distributed on the single index shard. Therefore, compared with the sort listing and the successive traversing and listing of the index shards, the listing mode of the present disclosure is the optimal solution for the subsequent concurrent tasks.

Figure 2:
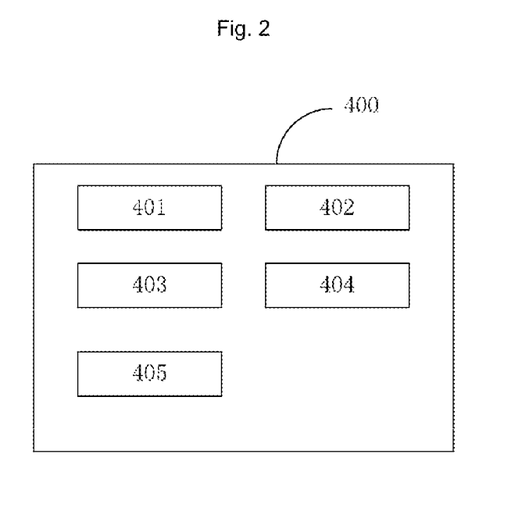
FIG. 2 is a schematic structural diagram of a service processing system according to an embodiment of the present disclosure.

Based on the same inventive concept, according to another aspect of the present disclosure, an embodiment of the present disclosure further provides a service processing system 400. As shown in FIG. 2, the system includes a determination component, a weight component, a listing component, an extraction component and a processing component.

The determination component 401 is configured to determine a first quantity parameter for acquiring index shards each time and a second quantity parameter of objects acquired by each index shard each time.

The weight component 402 is configured to assign a first weight to the first quantity parameter to obtain a third quantity parameter for acquiring the index shards.

The listing component 403 is configured to list, from a plurality of index shards at a bucket, index shards corresponding to the third quantity parameter, and list, from each listed index shard, the objects corresponding to the second quantity parameter, so as to obtain a matrix which takes each index shard as a column and a plurality of objects corresponding to each index shard as rows.

The extraction component 404 is configured to successively extract the plurality of the objects corresponding to each row of the matrix.

The processing component 405 is configured to, according to preset number of concurrent processing, process the plurality of the objects extracted each time.

In some embodiments, the extraction component 404 is configured to perform the following operation.

After object extraction is performed each time, the extracted objects are deleted from the matrix.

In some embodiments, the system further includes a first response component. The first response component is configured to perform the following operations.

A second weight is assigned to the first quantity parameter, so as to obtain a threshold.

Before object extraction is performed each time, whether the number of the index shards still having the objects is greater than 0 and less than the threshold is determined.

In response to the number of the index shards still having the objects being greater than 0 and less than the threshold, the index shards corresponding to the first quantity parameter are listed from several index shards in the bucket that are not listed, the objects corresponding to the second quantity parameter are listed from each listed index shard, and the newly listed index shards and the corresponding objects are added to the matrix.

In some embodiments, the system further includes a second response component. The second response component is configured to perform the following operation.

In response to the number of the index shards still having the objects equaling 0, the objects corresponding to the second quantity parameter are continued to list on each index shard in the bucket and corresponding to the matrix, and the objects are added to the matrix.

In some embodiments, the processing component 405 is further configured to perform the following operations.

Objects corresponding to the number of concurrent processing are selected from a plurality of extracted objects each time.

Whether the selected objects corresponding to the number of concurrent processing is required to be processed is determined.

In response to the objects corresponding to the number of concurrent processing being required to be processed, the objects corresponding to the number of concurrent processing are processed.

In some embodiments, the processing component 405 is further configured to perform the following operation.

In response to several of the objects corresponding to the number of concurrent processing being not required to be processed, the several objects that are not required to be processed are abandoned, and selection is continuously performed from the plurality of extracted objects, until the number of the objects required to be processed equals the number of concurrent processing.

Figure 3:
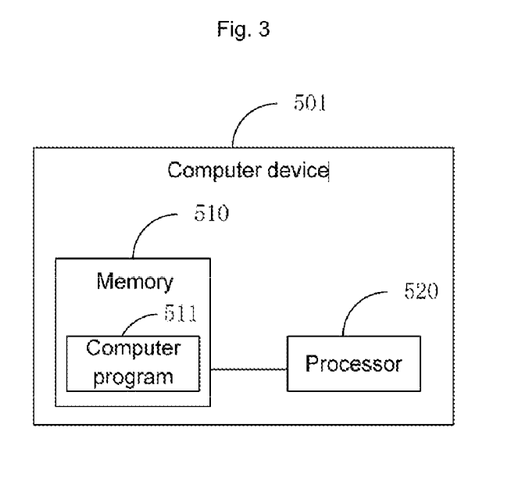
FIG. 3 is a schematic structural diagram of a computer device according to an embodiment of the present disclosure.

Based on the same inventive concept, according to another aspect of the present disclosure, as shown in FIG. 3, an embodiment of the present disclosure further provides a computer device 501.

The computer device includes at least one processor 520 and a memory 510.

The memory 510 is configured to store a computer program 511 executable on the processor. The processor 520, when executing the program, implements operations of any of the methods for service processing as described above.

Figure 4:
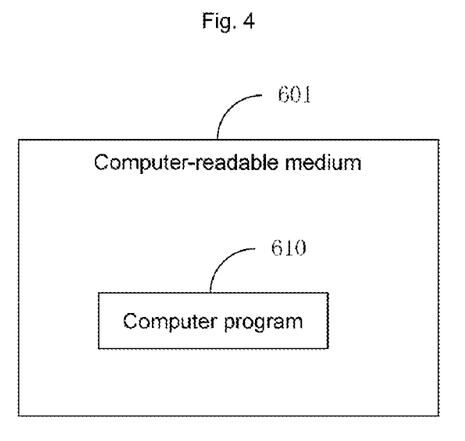
FIG. 4 is a schematic structural diagram of a computer-readable storage medium according to an embodiment of the present disclosure.

Based on the same inventive concept, according to another aspect of the present disclosure, as shown in FIG. 4, an embodiment of the present disclosure further provides a computer-readable storage medium 601. The computer-readable storage medium 601 stores a computer program instruction 610. When the computer program instruction 610 is executed, operations of any of the methods for service processing as described above are executed.

Finally, it is to be noted that, those skilled in the art can understand that all or part of the processes in the above method embodiments may be implemented by a computer program to instruct related hardware, and the program may be stored in a computer-readable storage medium. When the program is executed, the flow of each method embodiment as described above may be included.

In addition, it is to be understood that, the computer-readable storage medium (for example, a memory) herein may be a volatile memory or a non-volatile memory, or may include both volatile memory and non-volatile memory.

Those skilled in the art will also appreciate that, the various exemplary logical blocks, components, circuits, and algorithm steps described in combination with the disclosure may be implemented as electronic hardware, computer software, or a combination of the electronic hardware and the computer software. To clearly describe such interchangeability of hardware and software, various illustrative components, blocks, components, circuits, and steps have been described generally in terms of their functionality. Whether such functionality is implemented as software or hardware depends on the specific application and design constraints imposed on the entire system. Those skilled in the art may implement the functions in various ways for each specific application, but such implementation decisions should not be interpreted as causing a departure from the scope of the disclosed embodiments of the present disclosure.

The above are exemplary embodiments of the present disclosure, but it should be noted that, various changes and modifications may be made without departing from the scope disclosed in the embodiments of the present disclosure as defined in the claims. The functions, steps and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

It is to be understood that, as used herein, the singular form "a" is intended to include the plural form as well, unless the context clearly supports an exception. It is also be understood that, "and/or" as used herein is meant to include any and all possible combinations of one or more of the associated listed items.

The serial numbers of the foregoing embodiments of the present disclosure are merely for description, and do not represent the superiority or inferiority of the embodiments.

Those of ordinary skill in the art may understand that, all or part of the steps in the above embodiments may be completed by means of hardware, or may be completed by instructing the related hardware through a program. The program may be stored in a computer-readable storage medium, and the foregoing storage medium may be an ROM, a magnetic disk, or an optical disk.

Those of ordinary skill in the art should understand that, the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments can also be combined. In addition, there are many other changes in different aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A method for service processing, comprising:
   determining, by a processor, a first quantity parameter adapted for acquiring index shards each time and a second quantity parameter of objects acquired by each of the index shards each time;
   assigning, by the processor, a first weight to the first quantity parameter to obtain a third quantity parameter adapted for acquiring the index shards;
   listing, by the processor, from a plurality of index shards at a bucket, index shards corresponding to the third quantity parameter, and listing, from each of the index shards which is listed, the objects corresponding to the second quantity parameter, whereby a matrix is obtained, wherein the matrix takes each of the index shards which is listed as a column and a plurality of objects corresponding to each of the index shards which is listed as rows;
   successively extracting, by the processor, the plurality of the objects corresponding to each of the rows of the matrix; and
   processing, by the processor, according to preset number of concurrent processing, the plurality of the objects extracted each time,
   wherein, the first quantity parameter adapted for acquiring the index shards each time is the listed concurrence number, the second quantity parameter of the objects acquired by each index shard each time is the number of objects listed by the each index shard each time,
   all the objects are data at the same logical level in a bucket, objects under the bucket record indexes by means of rados objects, the indexes are divided into the index shards, and the objects are uniformly distributed on the each index shard,
   processing, by the processor, according to the preset number of concurrent processing, the plurality of the objects extracted each time further, comprises:
   selecting, by the processor, objects corresponding to the number of concurrent processing from the plurality of the objects extracted each time;
   determining, by the processor, whether the objects which are selected corresponding to the number of concurrent processing are required to be processed; and
   in response to the objects corresponding to the number of concurrent processing being required to be processed, processing, by the processor, the objects corresponding to the number of concurrent processing.

2. The method as claimed in claim 1, wherein successively extracting the plurality of the objects corresponding to each of the rows of the matrix further comprises:
   after the plurality of the objects is extracted each time, deleting, by the processor, extracted objects from the matrix.

3. The method as claimed in claim 2, further comprising:
   assigning, by the processor, a second weight to the first quantity parameter, whereby a threshold is obtained, wherein, the threshold=the second weight*the first quantity parameter;
   before the plurality of the objects is extracted each time, determining, by the processor, whether number of the index shards still having the objects is greater than 0 and less than the threshold; and
   in response to the number of the index shards still having the objects being greater than 0 and less than the threshold, listing, by the processor, index shards corresponding to the first quantity parameter from a plurality of index shards in the bucket that are not listed, and listing, by the processor, objects corresponding to the second quantity parameter from each of the index shards which is listed, and adding, by the processor, newly listed index shards and corresponding objects to the matrix.

4. The method as claimed in claim 3, further comprising:
   in response to the number of the index shards still having the objects equal to 0, continuing to list, by the processor, objects corresponding to the second quantity parameter on each index shard in the bucket and corresponding to the matrix, and adding, by the processor, the objects to the matrix.

5. The method as claimed in claim 4, wherein continuing to list the objects corresponding to the second quantity parameter on the each index shard in the bucket and corresponding to the matrix, comprises:
   In a case that the index shards and the objects are listed in the bucket, the objects are preferably listed on the index shards which have been listed.

6. The method as claimed in claim 3, wherein the second weight is less than the first weight.

7. The method as claimed in claim 1, further comprising:
   in response to a plurality of objects that are not required to be processed among the objects corresponding to the number of concurrent processing, abandoning, by the processor, the plurality of the objects that are not required to be processed, and continuing to perform selection, by the processor, from the plurality of the objects extracted, until number of objects required to be processed equals the number of concurrent processing.

8. The method as claimed in claim 7, wherein whether the objects which are performed selection corresponding to the number of concurrent processing are required to be processed is determined according to attributes corresponding to lifecycle of the objects.

9. A computer device, comprising:
at least one processor, and
a memory, storing a computer instruction executable on the at least one processor, wherein the computer instruction, when being executed by the at least one processor, cause the at least one processor to:
implements operation of the determine a first quantity parameter adapted for acquiring index shards each time and a second quantity parameter of objects acquired by each of the index shards each time;
assign a first weight to the first quantity parameter to obtain a third quantity parameter adapted for acquiring the index shards;
list, from a plurality of index shards at a bucket, index shards corresponding to the third quantity parameter, and listing, from each of the index shards which is listed, the objects corresponding to the second quantity parameter, whereby a matrix is obtained, wherein the matrix takes each of the index shards which is listed as a column and a plurality of objects corresponding to each of the index shards which is listed as rows;
successively extract the plurality of the objects corresponding to each of the rows of the matrix; and
process, according to preset number of concurrent processing, the plurality of the objects extracted each time,
wherein, the first quantity parameter adapted for acquiring the index shards each time is the listed concurrence number, the second quantity parameter of the objects acquired by each index shard each time is the number of objects listed by the each index shard each time,
all the objects are data at the same logical level in a bucket, objects under the bucket record indexes by means of rados objects, the indexes are divided into the index shards, and the objects are uniformly distributed on the each index shard,
process, according to the preset number of concurrent processing, the plurality of the objects extracted each time further, comprises:
select objects corresponding to the number of concurrent processing from the plurality of the objects extracted each time;
determine whether the objects which are selected corresponding to the number of concurrent processing are required to be processed; and
in response to the objects corresponding to the number of concurrent processing being required to be processed, process the objects corresponding to the number of concurrent processing.

10. The computer device as claimed in claim 9, wherein successively extracting the plurality of the objects corresponding to each of the rows of the matrix further comprises:
after the plurality of the objects is extracted each time, deleting extracted objects from the matrix.

11. The computer device as claimed in claim 10, the method further comprising:
assigning a second weight to the first quantity parameter, whereby a threshold is obtained, wherein, the threshold=the second weight*the first quantity parameter;
before the plurality of the objects is extracted each time, determining whether number of the index shards still having the objects is greater than 0 and less than the threshold; and
in response to the number of the index shards still having the objects being greater than 0 and less than the threshold, listing index shards corresponding to the first quantity parameter from a plurality of index shards in the bucket that are not listed, and listing objects corresponding to the second quantity parameter from each of the index shards which is listed, and adding newly listed index shards and corresponding objects to the matrix.

12. The computer device as claimed in claim 11, the method further comprising:
in response to the number of the index shards still having the objects equal to 0, continuing to list objects corresponding to the second quantity parameter on each index shard in the bucket and corresponding to the matrix, and adding the objects to the matrix.

13. The computer device as claimed in claim 11, wherein the second weight is less than the first weight.

14. The computer device as claimed in claim 9, wherein, processing according to the preset number of concurrent processing, the plurality of the objects extracted each time further, comprises:
selecting objects corresponding to the number of concurrent processing from the plurality of the objects extracted each time;
determining whether the objects which are selected corresponding to the number of concurrent processing are required to be processed; and
in response to the objects corresponding to the number of concurrent processing being required to be processed, processing the objects corresponding to the number of concurrent processing.

15. The computer device as claimed in claim 14, the method further comprising:
in response to a plurality of objects that are not required to be processed among the objects corresponding to the number of concurrent processing, abandoning the plurality of the objects that are not required to be processed, and continuing to perform selection from the plurality of the objects extracted, until number of objects required to be processed equals the number of concurrent processing.

16. The computer device as claimed in claim 9, wherein successively extracting the plurality of the objects corresponding to each of the rows of the matrix further comprises:
after the plurality of the objects is extracted each time, deleting extracted objects from the matrix.

17. The computer device as claimed in claim 16, the method further comprising:
assigning a second weight to the first quantity parameter, whereby a threshold is obtained, wherein, the threshold=the second weight*the first quantity parameter;
before the plurality of the objects is extracted each time, determining whether number of the index shards still having the objects is greater than 0 and less than the threshold; and
in response to the number of the index shards still having the objects being greater than 0 and less than the threshold, listing index shards corresponding to the first quantity parameter from a plurality of index shards in the bucket that are not listed, and listing objects corresponding to the second quantity parameter from each of the index shards which is listed, and adding newly listed index shards and corresponding objects to the matrix.

18. A non-volatile computer-readable storage medium, storing a computer program, wherein when the computer program is executed by a processor, the computer program is configured to cause the at least one processor to:

determine a first quantity parameter adapted for acquiring index shards each time and a second quantity parameter of objects acquired by each of the index shards each time;
assign a first weight to the first quantity parameter to obtain a third quantity parameter adapted for acquiring the index shards;
list, from a plurality of index shards at a bucket, index shards corresponding to the third quantity parameter, and listing, from each of the index shards which is listed, the objects corresponding to the second quantity parameter, whereby a matrix is obtained, wherein the matrix takes each of the index shards which is listed as a column and a plurality of objects corresponding to each of the index shards which is listed as rows;
successively extract the plurality of the objects corresponding to each of the rows of the matrix; and
process, according to preset number of concurrent processing, the plurality of the objects extracted each time,
wherein, the first quantity parameter adapted for acquiring the index shards each time is the listed concurrence number, the second quantity parameter of the objects acquired by each index shard each time is the number of objects listed by the each index shard each time,
all the objects are data at the same logical level in a bucket, objects under the bucket record indexes by means of rados objects, the indexes are divided into the index shards, and the objects are uniformly distributed on the each index shard,
process, according to the preset number of concurrent processing, the plurality of the objects extracted each time further, comprises:
select objects corresponding to the number of concurrent processing from the plurality of the objects extracted each time;
determine whether the objects which are selected corresponding to the number of concurrent processing are required to be processed; and
in response to the objects corresponding to the number of concurrent processing being required to be processed, process the objects corresponding to the number of concurrent processing.

* * * * *